D. W. PARKER.

Claw-Hammer.

No. 6,623. Reissued Aug. 31, 1875.

Witnesses,
J. W. Shumway
A. J. Tibbits

Charles Parker
assignee of
Dexter W. Parker
Inventor.
By atty.
John R. Earle

UNITED STATES PATENT OFFICE.

DEXTER W. PARKER, OF MERIDEN, CONNECTICUT, ASSIGNOR TO CHARLES PARKER, OF SAME PLACE.

IMPROVEMENT IN CLAW-HAMMERS.

Specification forming part of Letters Patent No. 147,427, dated February 10, 1874; reissue No. 6,623, dated August 31, 1875; application filed September 30, 1874.

*To all whom it may concern:*

Be it known that I, DEXTER W. PARKER, of Meriden, in the county of New Haven and State of Connecticut, have invented a new Improvement in Claw-Hammers; and I do hereby declare the following, when taken in connection with the accompanying drawings and the letters of reference marked thereon, to be a full, clear, and exact description of the same, and which said drawings constitute part of this specification, and represent, in—

Figure 1:
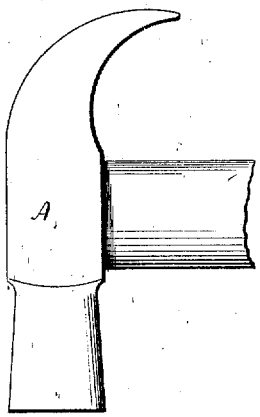
Figure 2:
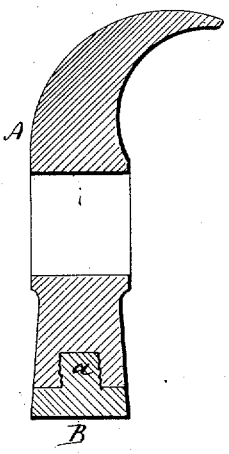

Figure 1, a side view, and in Fig. 2 a vertical central section.

This invention consists in a hammer formed from a metal body cast upon a previously-prepared head inserted in the mold before casting, the body and head united by the irregular form of the head.

A is the hammer, of substantially the usual form; B, the head or face. This head is first formed from steel, its upper surface prepared, here represented as with a projection, *a*. The mold is made of the form of the hammer complete. Then the head B is placed in the mold in the position it is to occupy, and the molten metal poured into the molds flows upon the previously-prepared upper surface of the head, firmly attaching it thereto, and the completed hammer is removed from the mold. The head may be tempered to the desired extent the same as a steel hammer, and for general use the hammer is as good as a forged hammer, and is produced for about one-fourth the cost.

I have represented my invention as applied to claw-hammers; but it may, with equal facility, be applied to some other classes of hammers.

I do not wish to be understood as broadly claiming forming an article partly from cast and partly from wrought metal, united by casting.

I claim as my invention—

The herein-described hammer, constructed by placing in the mold the previously-prepared head, then pouring the metal for the body into the mold, substantially as described.

DEXTER W. PARKER.

Witnesses:

GEORGE C. MERRIAM,
RALPH A. PALMER.